US011511576B2

(12) United States Patent
Raeis Hosseiny et al.

(10) Patent No.: US 11,511,576 B2
(45) Date of Patent: Nov. 29, 2022

(54) REMOTE TRAILER MANEUVER ASSIST SYSTEM

(71) Applicant: Ford Global Technologies, LLC, Dearborn, MI (US)

(72) Inventors: Seyed Armin Raeis Hosseiny, Canton, MI (US); Erick Michael Lavoie, Van Buren Charter Township, MI (US); Siyuan Ma, Detroit, MI (US); Bo Bao, Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 414 days.

(21) Appl. No.: 16/752,123

(22) Filed: Jan. 24, 2020

(65) Prior Publication Data
US 2021/0229509 A1 Jul. 29, 2021

(51) Int. Cl.
*B62D 6/00* (2006.01)
*B60D 1/26* (2006.01)
*B62D 13/06* (2006.01)
*B60W 40/02* (2006.01)
(Continued)

(52) U.S. Cl.
CPC .............. *B60D 1/26* (2013.01); *B60W 40/02* (2013.01); *B62D 13/06* (2013.01); *B60W 60/0025* (2020.02); *B60W 2050/0064* (2013.01)

(58) Field of Classification Search
None
See application file for complete search history.

(56) References Cited

U.S. PATENT DOCUMENTS 8,436,902 B2 * 5/2013 Kuehnle ................. G01W 1/14
  348/148
8,665,079 B2 * 3/2014 Pawlicki ............... B60W 30/12
  340/436
(Continued)

FOREIGN PATENT DOCUMENTS

DE    102016224528 A1    6/2018

OTHER PUBLICATIONS

"Trailering & Towing Technology in the Sierra—GMC Life," Web page <https://www.gmc.com/gmc-life/truks/tailering-and-towing-technology-in-the-next-generation-2019-sierra.html>, 6 pages, retrieved from the internet on Oct. 26, 2020.

*Primary Examiner* — Jonathan M Dager
(74) *Attorney, Agent, or Firm* — Frank Lollo; Eversheds Sutherland (US) LLP

(57) ABSTRACT

A Remote Trailer Maneuvering (RTM) system includes a mobile device app that identifies and processes environmental information from a photo, to identify obstacles such as walls, surrounding objects, etc. When the RTM system detects a boat, a trailer, and a boat ramp, it calculates a travel distance to drive the trailer into the water for unloading the boat. The RTM system identifies obstructions, outputs information and warnings, and prompts for information and user control feedback. Once the photo is processed, the RTM system sends control instructions to an RTM controller onboard the vehicle. The vehicle may send a responsive message to the mobile device indicating that the RTM system is ready to proceed with the maneuvering function. The RTM controller maneuvers the trailer, using an autonomous vehicle controller, to the target position using the control instructions.

20 Claims, 7 Drawing Sheets

(51) Int. Cl.
*B60W 50/00* (2006.01)
*B60W 60/00* (2020.01)

(56) References Cited

U.S. PATENT DOCUMENTS

| | | | | |
|---|---|---|---|---|
| 8,861,791 B2* | 10/2014 | You | G06V 10/443 | 382/104 |
| 9,352,777 B2* | 5/2016 | Lavoie | H04N 7/183 | |
| 9,500,497 B2* | 11/2016 | Lavoie | B60W 30/06 | |
| 9,506,774 B2* | 11/2016 | Shutko | B60W 30/06 | |
| 9,536,155 B2* | 1/2017 | Takemae | E01F 11/00 | |
| 9,829,883 B1* | 11/2017 | Lavoie | G05D 1/0223 | |
| 9,937,953 B2* | 4/2018 | Lavoie | B60D 1/245 | |
| 9,969,428 B2* | 5/2018 | Hafner | H04N 7/183 | |
| 9,981,662 B2* | 5/2018 | Lavoie | B60W 10/06 | |
| 10,126,755 B1* | 11/2018 | Lavi | B60D 1/62 | |
| 10,160,274 B1* | 12/2018 | Gignac | B60R 1/00 | |
| 10,214,241 B2* | 2/2019 | Shepard | B62D 15/02 | |
| 10,286,950 B2* | 5/2019 | Lavoie | B60W 30/146 | |
| 10,345,822 B1* | 7/2019 | Parchami | G05D 1/0088 | |
| 10,730,553 B2* | 8/2020 | Raad | B62D 13/005 | |
| 10,773,721 B2* | 9/2020 | Buss | B60W 40/10 | |
| 10,800,454 B2* | 10/2020 | Lavoie | B62D 13/06 | |
| 10,814,912 B2* | 10/2020 | Cotter | B60R 1/00 | |
| 11,024,051 B2* | 6/2021 | Gomezcaballero | G06T 7/73 | |
| 11,027,667 B2* | 6/2021 | Greenwood | B60R 1/00 | |
| 11,034,364 B1* | 6/2021 | Narang | G08G 1/0133 | |
| 2006/0132295 A1* | 6/2006 | Gem | B60Q 9/008 | 340/438 |
| 2011/0184605 A1* | 7/2011 | Neff | G05D 1/0255 | 701/25 |
| 2012/0288154 A1* | 11/2012 | Shima | G06T 7/174 | 382/103 |
| 2013/0151058 A1* | 6/2013 | Zagorski | G05D 1/0289 | 701/1 |
| 2014/0032049 A1* | 1/2014 | Moshchuk | G08G 1/166 | 701/42 |
| 2014/0218522 A1* | 8/2014 | Lavoie | G08G 1/167 | 348/148 |
| 2014/0249691 A1* | 9/2014 | Hafner | B62D 15/0285 | 701/1 |
| 2014/0358429 A1* | 12/2014 | Shutko | B60W 50/14 | 701/458 |
| 2015/0120141 A1* | 4/2015 | Lavoie | B60W 30/06 | 701/41 |
| 2017/0291603 A1* | 10/2017 | Nakamura | B60W 30/095 | |
| 2017/0329332 A1* | 11/2017 | Pilarski | B60W 30/095 | |
| 2018/0233034 A1* | 8/2018 | Tachibana | G08G 1/017 | |
| 2018/0267558 A1* | 9/2018 | Tiwari | G05D 1/0246 | |
| 2019/0135291 A1* | 5/2019 | Sim | G06V 20/597 | |
| 2019/0202251 A1* | 7/2019 | Hall | B60D 1/30 | |
| 2019/0202451 A1* | 7/2019 | Hayamizu | B60W 30/09 | |
| 2019/0205024 A1* | 7/2019 | Lavoie | G06F 3/0416 | |
| 2019/0210418 A1* | 7/2019 | Hall | B60D 1/245 | |
| 2019/0213290 A1* | 7/2019 | Delva | G01M 17/007 | |
| 2019/0276013 A1* | 9/2019 | Kim | B60W 50/0097 | |
| 2019/0291730 A1* | 9/2019 | Kamiya | B60W 30/09 | |
| 2019/0294170 A1* | 9/2019 | Kazemi | G05D 1/0274 | |
| 2019/0347498 A1* | 11/2019 | Herman | G08G 1/162 | |
| 2020/0062245 A1* | 2/2020 | Samotsvet | G06T 7/60 | |
| 2020/0064855 A1* | 2/2020 | Ji | G05D 1/0214 | |
| 2020/0066147 A1* | 2/2020 | Vadillo | G05D 1/0291 | |
| 2020/0086793 A1* | 3/2020 | Watanabe | H04N 5/272 | |
| 2020/0097001 A1* | 3/2020 | Lavoie | G06F 3/04845 | |
| 2020/0110402 A1* | 4/2020 | Golgiri | A63H 30/04 | |
| 2020/0133259 A1* | 4/2020 | Van Wiemeersch | B60W 50/029 | |
| 2020/0150652 A1* | 5/2020 | Urano | B60W 50/082 | |
| 2020/0249684 A1* | 8/2020 | Onofrio | G05D 1/0219 | |
| 2020/0257299 A1* | 8/2020 | Wang | G08G 1/167 | |
| 2020/0355823 A1* | 11/2020 | Tingley | G01S 13/865 | |
| 2021/0061270 A1* | 3/2021 | Parks | B60W 50/14 | |
| 2021/0082220 A1* | 3/2021 | Boerger | B65G 67/02 | |
| 2021/0107567 A1* | 4/2021 | Varunjikar | B62D 15/0265 | |
| 2021/0129835 A1* | 5/2021 | Viehmann | B62D 9/005 | |
| 2021/0129865 A1* | 5/2021 | Jeong | G08G 1/162 | |
| 2021/0171136 A1* | 6/2021 | Kaiser | B60K 7/0015 | |
| 2021/0190536 A1* | 6/2021 | Gil Casals | G01C 21/3841 | |
| 2021/0197852 A1* | 7/2021 | Fairfield | G01C 21/3453 | |
| 2021/0206389 A1* | 7/2021 | Kim | G01C 21/3415 | |
| 2021/0229589 A1* | 7/2021 | Wright, III | G01S 13/867 | |
| 2021/0235019 A1* | 7/2021 | Tonkin | G06T 7/50 | |
| 2021/0237739 A1* | 8/2021 | Hayakawa | B60W 50/14 | |
| 2021/0269092 A1* | 9/2021 | Golgiri | B60D 1/62 | |
| 2021/0276588 A1* | 9/2021 | Kabzan | B60W 60/00 | |
| 2021/0309217 A1* | 10/2021 | Kim | B60W 60/0015 | |
| 2022/0009522 A1* | 1/2022 | Zhang | B60W 30/12 | |
| 2022/0017079 A1* | 1/2022 | Kakeshita | G06V 20/58 | |
| 2022/0017080 A1* | 1/2022 | Moriya | B60W 30/0956 | |
| 2022/0017081 A1* | 1/2022 | Yokoyama | G06V 10/60 | |
| 2022/0048499 A1* | 2/2022 | Yang | B60W 10/20 | |
| 2022/0063622 A1* | 3/2022 | Jumpertz | B60W 10/18 | |
| 2022/0063664 A1* | 3/2022 | Liu | B60W 60/0011 | |
| 2022/0073095 A1* | 3/2022 | Seitz | B60W 60/001 | |
| 2022/0080977 A1* | 3/2022 | Ucar | B60W 40/09 | |
| 2022/0105931 A1* | 4/2022 | Motegi | B62D 15/021 | |

\* cited by examiner

REMOTE TRAILER MANEUVER ASSIST SYSTEM

TECHNICAL FIELD

The present disclosure relates to a vehicle interface system for an autonomous vehicle, and more particularly, to an interface system and remote trailer vehicle maneuver system.

BACKGROUND

Operating a vehicle with a trailer in tow is very challenging for many drivers. This is particularly true for drivers that are unskilled at backing up vehicles with attached trailers, which may include those that drive with a trailer on an infrequent basis (e.g., have rented a trailer, use a personal trailer on an infrequent basis, etc.). Trailer backup assist systems for vehicles may include an onboard user interface that allows the user to steer a trailer towed by the vehicle through an automated steering controller that provides the steering motion that moves the trailer along a user-defined path curvature.

A system for configuring a trailer model for a trailer maneuvering is disclosed in U.S. Pat. No. 9,352,777, assigned to Ford Global Technologies, LLC (hereafter "the '777 Publication"). The system described in the '777 Publication includes a mobile device used to capture 3D trailer data to create a trailer profile to communicate to the trailer maneuvering system. The mobile device may also be used to capture dimensional data, such as the distance between a first reference point and a second reference point on the vehicle and trailer. A request may also be provided by the mobile device to take a photo of the trailer itself. It may be advantageous to further provide Autonomous Vehicle (AV) control integration and other intuitive features that utilize sensing capability of the mobile device to assess the environment, measure the boundaries of a parking space, and provide a user interface for input of a target position and orientation of the vehicle and trailer.

It is with respect to these and other considerations that the disclosure made herein is presented.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The systems and methods disclosed herein are configured to improve a Remote Trailer Maneuvering (RTM) system through the use of a mobile device application or "app". The RTM app prompts the user to take a photo of the target location for positioning the trailer. The mobile device processes the photo by identifying and characterizing environmental information for possible obstacles, such as walls, surrounding objects, etc. The RTM app may process the photo with steps that include overlaying overlay a representation of the trailer at a desired position using an Augmented Reality (AR) controller. When a boat is detected as the trailer payload, and the RTM system further identifies a boat ramp, the system calculates a travel distance to drive the trailer into the water for unloading the boat.

The RTM system may determine the distance using various methods, including determining a salinity level of the water, measuring relative distances between the vehicle, the trailer/trailer contents, the water, obstacles in the vicinity, and using other measurements. The RTM system may identify any obstructions that are predicted to prevent completion of the operation that results in the trailer ending at the target position, and output information and warnings to the user, prompt for information and user control feedback, and provide other information useful for completion of the trailer maneuvering operation.

Once the photo is processed, the RTM system on the mobile device sends control instructions to the RTM controller onboard the vehicle for validation and execution. The vehicle may send a responsive message to the mobile device indicating that the RTM system is ready to proceed with the maneuvering function.

Embodiments described in the present disclosure may allow a user to initiate an automated trailering maneuver operation and indicate the desired destination for the trailer without continuously providing tedious control inputs.

These and other advantages of the present disclosure are provided in greater detail herein.

Illustrative Embodiments

The disclosure will be described more fully hereinafter with reference to the accompanying drawings, in which exemplary embodiments of the disclosure are shown, and not intended to be limiting.

Figure 1:
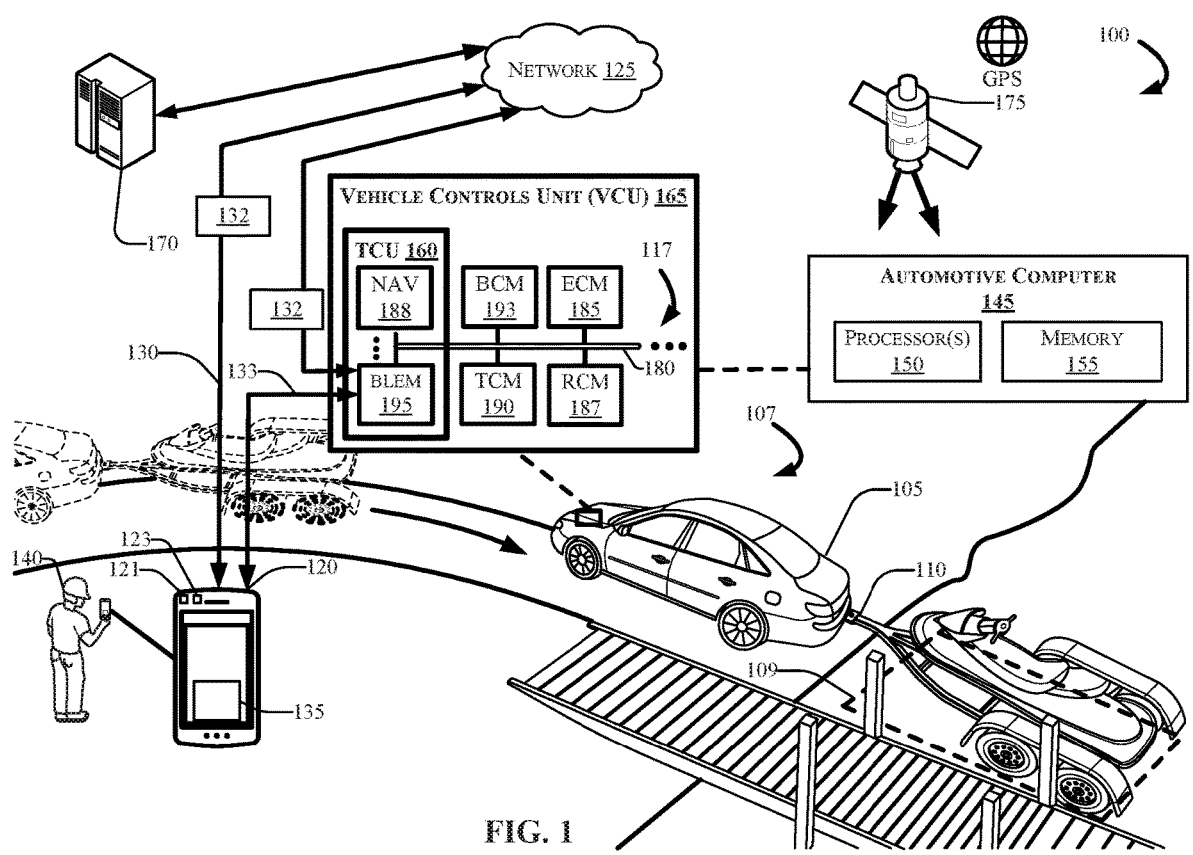
FIG. 1 depicts an example computing environment in which techniques and structures for providing the systems and methods disclosed herein may be implemented.

FIG. 1 depicts an example computing environment 100 (also referred to herein as the trailer parking environment 100") that can include one or more vehicle(s) 105 comprising an automotive computer 145, and a Vehicle Controls Unit (VCU) 165 that includes a plurality of electronic control units (ECUs) 117 disposed in communication with the automotive computer 145 and a Remote Trailer Maneuvering (RTM) system 107. A mobile device 120, which may be associated with a user 140 and the vehicle 105, may connect with the automotive computer 145 using wired and/or wireless communication protocols and transceivers. The mobile device 120 may be communicatively coupled with the vehicle 105 via one or more network(s) 125, which may communicate via one or more wireless channel(s) 130, and/or may connect with the vehicle 105 directly using near field communication (NFC) protocols, Bluetooth® protocols, Wi-Fi, Ultra-Wide Band (UWB), and other possible data connection and sharing techniques. The vehicle 105 may also receive and/or be in communication with a Global Positioning System (GPS) 175.

The automotive computer 145 may be or include an electronic vehicle controller, having one or more processor(s) 150 and memory 155. The automotive computer 145 may, in some example embodiments, be disposed in communication with the mobile device 120, and one or more server(s) 170. The server(s) 170 may be part of a cloud-based computing infrastructure, and may be associated with and/or include a Telematics Service Delivery Network (SDN) that provides digital data services to the vehicle 105 and other vehicles (not shown in FIG. 1) that may be part of a vehicle fleet.

Although illustrated as a car, the vehicle 105 may take the form of another passenger or commercial automobile such as, for example, a car, a truck, a sport utility, a crossover vehicle, a van, a minivan, a taxi, a bus, etc., and may be configured to include various types of automotive drive systems. Exemplary drive systems can include various types of internal combustion engine (ICE) powertrains having a gasoline, diesel, or natural gas-powered combustion engine with conventional drive components such as, a transmission, a drive shaft, a differential, etc. In another configuration, the vehicle 105 may be configured as an electric vehicle (EV). More particularly, the vehicle 105 may include a battery EV (BEV) drive system, or be configured as a hybrid EV (HEV) having an independent onboard power plant, a plug-in HEV (PHEV) that includes a HEV powertrain connectable to an external power source, and including a parallel or series hybrid powertrain having a combustion engine power plant and one or more EV drive systems. HEVs can include battery and/or super capacitor banks for power storage, flywheel power storage systems, or other power generation and storage infrastructure. The vehicle 105 may be further configured as a fuel cell vehicle (FCV) that converts liquid or solid fuel to usable power using a fuel cell, (e.g., a hydrogen fuel cell vehicle (HFCV) powertrain, etc.) and/or any combination of these drive systems and components.

Further, the vehicle 105 may be a manually driven vehicle, and/or be configured to operate in a fully autonomous (e.g., driverless) mode (e.g., level-5 autonomy) or in one or more partial autonomy modes. Examples of partial autonomy modes are widely understood in the art as autonomy Levels 1 through 5. An autonomous vehicle (AV) having Level 1 autonomy may generally include a single automated driver assistance feature, such as steering or acceleration assistance. Adaptive cruise control is one such example of a Level-1 autonomous system that includes aspects of both acceleration and steering. Level-2 autonomy in vehicles may provide partial automation of steering and acceleration functionality, where the automated system(s) are supervised by a human driver that performs non-automated operations such as braking and other controls. Level-3 autonomy in a vehicle can generally provide conditional automation and control of driving features. For example, Level-3 vehicle autonomy typically includes "environmental detection" capabilities, where the vehicle can make informed decisions independently from a present driver, such as accelerating past a slow-moving vehicle, while the present driver remains ready to retake control of the vehicle if the system is unable to execute the task. Level 4 autonomy includes vehicles having high levels of autonomy that can operate independently from a human driver, but still include human controls for override operation. Level-4 automation may also enable a self-driving mode to intervene responsive to a predefined conditional trigger, such as a road hazard or a system failure. Level 5 autonomy is associated with autonomous vehicle systems that require no human input for operation, and generally do not include human operational driving controls.

According to embodiments of the present disclosure, the RTM system 107 may be configured to operate with a vehicle having a Level-2 or Level-3 autonomous vehicle controller. An example AV controller 235 is described in greater detail with respect to FIG. 2. Accordingly, the RTM system 107 may provide some aspects of human control to the vehicle 105, when the vehicle is configured as an AV.

The mobile device 120 generally includes a memory 123 for storing program instructions associated with an application 135 that, when executed by a mobile device processor 121, performs aspects of the disclosed embodiments. The application (or "app") 135 may be part of the RTM system 107, or may provide information to the RTM system 107 and/or receive information from the RTM system 107.

In some aspects, the mobile device 120 may communicate with the vehicle 105 through the one or more wireless channel(s) 130, which may be encrypted and established between the mobile device 120 and a Telematics Control Unit (TCU) 160. The mobile device 120 may communicate with the TCU 160 using a wireless transmitter associated with the TCU 160 on the vehicle 105. The transmitter may communicate with the mobile device 120 using a wireless communication network such as, for example, the one or more network(s) 125. The wireless channel(s) 130 are depicted in FIG. 1 as communicating via the one or more network(s) 125, and also via direct communication with the vehicle 105.

The network(s) 125 illustrate an example of an example communication infrastructure in which the connected devices discussed in various embodiments of this disclosure may communicate. The network(s) 125 may be and/or include the Internet, a private network, public network or other configuration that operates using any one or more known communication protocols such as, for example, transmission control protocol/Internet protocol (TCP/IP), Bluetooth®, Wi-Fi based on the Institute of Electrical and Electronics Engineers (IEEE) standard 802.11, Ultra-Wide Band (UWB), and cellular technologies such as Time Division Multiple Access (TDMA), Code Division Multiple Access (CDMA), High Speed Packet Access (HSPDA), Long-Term Evolution (LTE), Global System for Mobile Communications (GSM), and Fifth Generation (5G), to name a few examples.

The automotive computer 145 may be installed in an engine compartment of the vehicle 105 (or elsewhere in the vehicle 105) and operate as a functional part of the RTM system 107, in accordance with the disclosure. The automotive computer 145 may include one or more processor(s) 150 and a computer-readable memory 155.

The one or more processor(s) 150 may be disposed in communication with one or more memory devices disposed in communication with the respective computing systems (e.g., the memory 155 and/or one or more external databases not shown in FIG. 1). The processor(s) 150 may utilize the memory 155 to store programs in code and/or to store data for performing aspects in accordance with the disclosure. The memory 155 may be a non-transitory computer-readable memory storing program code. The memory 155 can include any one or a combination of volatile memory elements (e.g., dynamic random access memory (DRAM), synchronous dynamic random access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.

The VCU 165 may coordinate the data between vehicle 105 systems, connected servers (e.g., the server(s) 170), and other vehicles (not shown in FIG. 1) operating as part of a vehicle fleet. The VCU 165 can include or communicate with any combination of the ECUs 117, such as, for example, a Body Control Module (BCM) 193, an Engine Control Module (ECM) 185, a Transmission Control Module (TCM) 190, the TCU 160, a Restraint Control Module (RCM) 187, etc. In some aspects, the VCU 165 may control aspects of the vehicle 105, and implement one or more instruction sets received from the application 135 operating on the mobile device 120, and/or from instructions received from an autonomous vehicle (AV) controller such as an AV controller 235 discussed with respect to FIG. 2.

The TCU 160 can be configured to provide vehicle connectivity to wireless computing systems onboard and offboard the vehicle 105, and may include a Navigation (NAV) receiver 188 for receiving and processing a GPS signal from the GPS 175, a Bluetooth® Low-Energy Module (BLEM) 195, a Wi-Fi transceiver, an Ultra-Wide Band (UWB) transceiver, and/or other wireless transceivers (not shown in FIG. 1) that may be configurable for wireless communication between the vehicle 105 and other systems, computers, and modules. The TCU 160 may be disposed in communication with the ECUs 117 by way of a Controller Area Network (CAN) bus 180. In some aspects, the TCU 160 may retrieve data and send data as a CAN bus 180 node.

The BLEM 195 may establish wireless communication using Bluetooth® and Bluetooth Low-Energy® communication protocols by broadcasting and/or listening for broadcasts of small advertising packets, and establishing connections with responsive devices that are configured according to embodiments described herein. For example, the BLEM 195 may include Generic Attribute Profile (GATT) device connectivity for client devices that respond to or initiate GATT commands and requests, and connect directly with the mobile device 120.

The CAN bus 180 may be configured as a multi-master serial bus standard for connecting two or more of the ECUs 117 as nodes using a message-based protocol that can be configured and/or programmed to allow the ECUs 117 to communicate with each other. The CAN bus 180 may be or include a high speed CAN (which may have bit speeds up to 1 Mb/s on CAN, 5 Mb/s on CAN Flexible Data Rate (CAN FD)), and can include a low-speed or fault tolerant CAN (up to 125 Kbps), which may, in some configurations, use a linear bus configuration. In some aspects, the ECUs 117 may communicate with a host computer (e.g., the automotive computer 145, the RTM system 107, and/or the server(s) 170, etc.), and may also communicate with one another without the necessity of a host computer. The CAN bus 180 may connect the ECUs 117 with the automotive computer 145 such that the automotive computer 145 may retrieve information from, send information to, and otherwise interact with the ECUs 117 to perform steps described according to embodiments of the present disclosure. The CAN bus 180 may connect CAN bus nodes (e.g., the ECUs 117) to each other through a two-wire bus, which may be a twisted pair having a nominal characteristic impedance. The CAN bus 180 may also be accomplished using other communication protocol solutions, such as Media Oriented Systems Transport (MOST) or Ethernet. In other aspects, the CAN bus 180 may be a wireless intra-vehicle CAN bus.

The VCU 165 may control various loads directly via the CAN bus 180 communication or implement such control in conjunction with the BCM 193. The ECUs 117 described with respect to the VCU 165 are provided for exemplary purposes only, and are not intended to be limiting or exclusive. Control and/or communication with other control modules not shown in FIG. 1 is possible, and such control is contemplated.

In an example embodiment, the ECUs 117 may control aspects of vehicle operation and communication using inputs from human drivers, inputs from an autonomous vehicle controller, the RTM system 107, and/or via wireless signal inputs received via the wireless channel(s) 133 from other connected devices such as the mobile device 120, among others. The ECUs 117, when configured as nodes in the CAN bus 180, may each include a central processing unit (CPU), a CAN controller, and/or a transceiver (not shown in FIG. 1). For example, although the mobile device 120 is depicted in FIG. 1 as connecting to the vehicle 105 via the BLEM 195, it is contemplated that the wireless connection 133 may also or alternatively be established between the mobile device 120 and one or more of the ECUs 117 via the respective transceiver(s) associated with the module(s).

The BCM 193 generally includes integration of sensors, vehicle performance indicators, and variable reactors associated with vehicle systems, and may include processor-based power distribution circuitry that can control functions associated with the vehicle body such as lights, windows, security, door locks and access control, and various comfort controls. The BCM 193 may also operate as a gateway for bus and network interfaces to interact with remote ECUs (not shown in FIG. 1).

The BCM 193 may coordinate any one or more functions from a wide range of vehicle functionality, including energy management systems, alarms, vehicle immobilizers, driver and rider access authorization systems, Phone-as-a-Key (PaaK) systems, driver assistance systems, Autonomous Vehicle (AV) control systems, power windows, doors, actuators, and other functionality, etc. The BCM 193 may be configured for vehicle energy management, exterior lighting control, wiper functionality, power window and door functionality, heating ventilation and air conditioning systems, and driver integration systems. In other aspects, the BCM 193 may control auxiliary equipment functionality, and/or be responsible for integration of such functionality. In one aspect, a vehicle having a trailer control system may integrate the system using, at least in part, the BCM 193.

The computing system architecture of the automotive computer 145, VCU 165, and/or the RTM system 107 may omit certain computing modules. It should be readily understood that the computing environment depicted in FIG. 1 is one example of a possible implementation according to the present disclosure, and thus, it should not to be considered limiting or exclusive.

Figure 2:
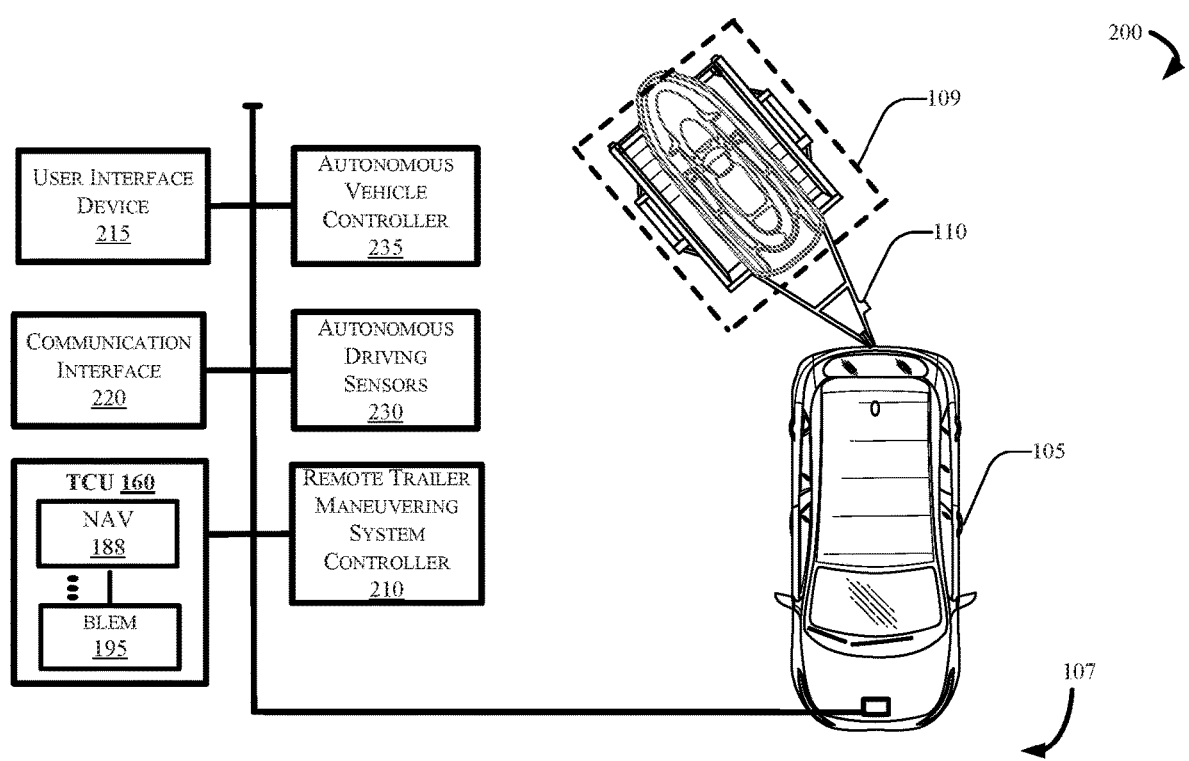
FIG. 2 illustrates an example functional schematic of a control system configured as part of a Remote Trailer Maneuver (RTM) system that may be configured for use in the vehicle of FIG. 1 in accordance with the present disclosure.

FIG. 2 illustrates an example functional schematic of a control system 200 that may be configured for use in the vehicle 105. The control system 200 can include an RTM system controller 210, a user interface device 215, the TCU 160, including the NAV system 188, the BLEM 195, and other transceivers (not shown in FIG. 2), a communication interface 220, a plurality of autonomous driving sensors 230.

The user interface device 215 may be configured or programmed to present information to a user (e.g., the user 140 depicted with respect to FIG. 1) during operation of the vehicle 105. Moreover, the user interface device 215 may be configured or programmed to receive user inputs, and thus, it may be disposed in or on the vehicle 105 such that it is viewable and may be interacted with by a passenger or operator. For example, in one embodiment where the vehicle 105 is a passenger vehicle, the user interface device 215 may be located in the passenger compartment. In another possible embodiment, the user interface device 215 may include a touch-sensitive display screen (not shown in FIG. 2).

In some aspects of the present disclosure, the user interface device 215 may be and/or include the mobile device 120 as discussed with respect to FIG. 1. For example, the user interface device 215 may be a smartphone that connects to the vehicle 105 via the BLEM 195, through the network(s) 125 (as shown on FIG. 1), and/or in some other fashion, and obtain sensor data on behalf of the RTM system 107. In an example embodiment, the user interface device 215 may receive an image of a trailer parking environment, such that the RTM system 107 can determine the target position 109 for parking the trailer 110 using the image data. The RTM system controller 210 may receive configuration messages from the mobile device, and maneuver the trailer 110 to the target position 109 based on the determined maneuver path, and further based on sensed environmental conditions received by the autonomous driving sensors 230. The AV controller 235 may also incorporate data from the NAV system 188 to determine a relative position for the vehicle 105, and by extension, determine a current position of the trailer 110 with respect to the target position 109, as well as any obstacles that may intervene between the trailer 110 and arrival at the target position 109.

The NAV system 188 may be configured and/or programmed to determine a position of the vehicle 105, and the trailer 110. The NAV system 188 may include a Global Positioning System (GPS) receiver configured or programmed to triangulate the position of the vehicle 105 relative to satellites or terrestrial based transmitter towers associated with the GPS system 175 (as shown in FIG. 1). The NAV system 188, therefore, may be configured or programmed for wireless communication. The NAV system 188 may be further configured or programmed to develop routes from a current location to a selected destination (e.g., the target position 109), as well as display a map (not shown in FIG. 2) and present driving directions to the selected destination via, e.g., the user interface device 215. In some instances, the NAV system 188 may develop the route according to a user preference. Examples of user preferences may include maximizing fuel efficiency, reducing travel time, travelling the shortest distance, or the like.

The TCU 160 generally includes wireless transmission and communication hardware that may be disposed in communication with one or more transceivers associated with telecommunications towers and other wireless telecommunications infrastructure (not shown in FIG. 2). For example, the BLEM 195 may be configured and/or programmed to receive messages from, and transmit messages to, one or more cellular towers associated with a telecommunication provider, and/or and a Telematics Service Delivery Network (SDN) associated with the vehicle 105 for coordinating vehicle fleet (not shown in FIG. 2) information, receiving trailer profile information from the RTM system controller 210, and sending trailer profiles to the RTM system controller 210 when requested by an authenticated RTM system 107. For example, the RTM system 107 may identify geographical reference points associated with the trailer 110, and receive trailer dimensional data corresponding to kinematic models of the trailer 110 and the trailer payload. Such a method is described in greater detail in U.S. Pat. No. 9,352,777 published on May 31, 2016 (assigned to Ford Global Technologies, LLC), incorporated herein by reference. The user interface device 215 may provide the input data, dimensional data, and other input information, from which the RTM system 107 may create, update, and utilize as trailer profile information containing the trailer dimensions.

In other aspects, the autonomous driving sensors 230 may utilize sensor data from the user interface device (configured as a mobile device or smartphone), in conjunction with the trailer and trailer payload dimension data from the trailer profile information, to determine dimension information associated with obstacles identified in the operating environment. Examples of such identification are described in greater detail with respect to the following figures.

The autonomous driving sensors 230 may include any number of devices configured or programmed to generate signals that help navigate the vehicle 105 while the vehicle 105 is operating in the autonomous (e.g., driverless) mode. Examples of autonomous driving sensors 230 may include a Radio Detection and Ranging (RADAR or "radar") sensor configured for detection and localization of objects using radio waves, a Light Detecting and Ranging (LiDAR or "lidar") sensor, a vision sensor system having trajectory, obstacle detection, object classification, augmented reality, and/or other capabilities, and/or the like. The autonomous driving sensors 230 may provide instrumentation data to the vehicle 105 to "see" the roadway and the vehicle surroundings, and/or negotiate various obstacles while the vehicle is operating in the autonomous mode as it performs the trailer maneuver assist operation.

The autonomous vehicle controller 235 may be configured or programmed to control one or more vehicle subsystems while the vehicle is operating in the autonomous mode. Examples of subsystems that may be controlled by the autonomous vehicle controller 235 may include one or more systems for controlling braking, ignition, steering, acceleration, transmission control, and/or other control mechanisms. The autonomous vehicle controller 235 may control the subsystems based, at least in part, on signals generated by the autonomous driving sensors 230, and the RTM system 107.

Conventional Trailer Backup Assist (PTBA) systems, such as the system described in the U.S. Pat. No. 9,352,777, may provide intuitive interfaces that allow a user to steer a trailer by providing an automated steering controller. In such systems, the PTBA system may provide the correct steering motion that moves the trailer along a desired path curvature, which may be indicated by a user of the device. Without the PTBA controller, it may be counter-intuitive for a customer to manually steer the vehicle in order to provide the correct inputs at the steering wheel to direct the trailer along a desired path curvature. In some aspects, the RTM system 107 may improve upon the current system by providing a way for a user 140 to specify the target location to which the vehicle and trailer is to be maneuvered. The user 140 may provide information to The RTM system 107, with which the system identifies the target parking spot for the trailer 110 (e.g., the target position 109), and forms a digital model indicative of a general layout of the trailer parking environment 100 (as depicted in FIG. 1, from input data obtained by the mobile device 120.

Figure 3:
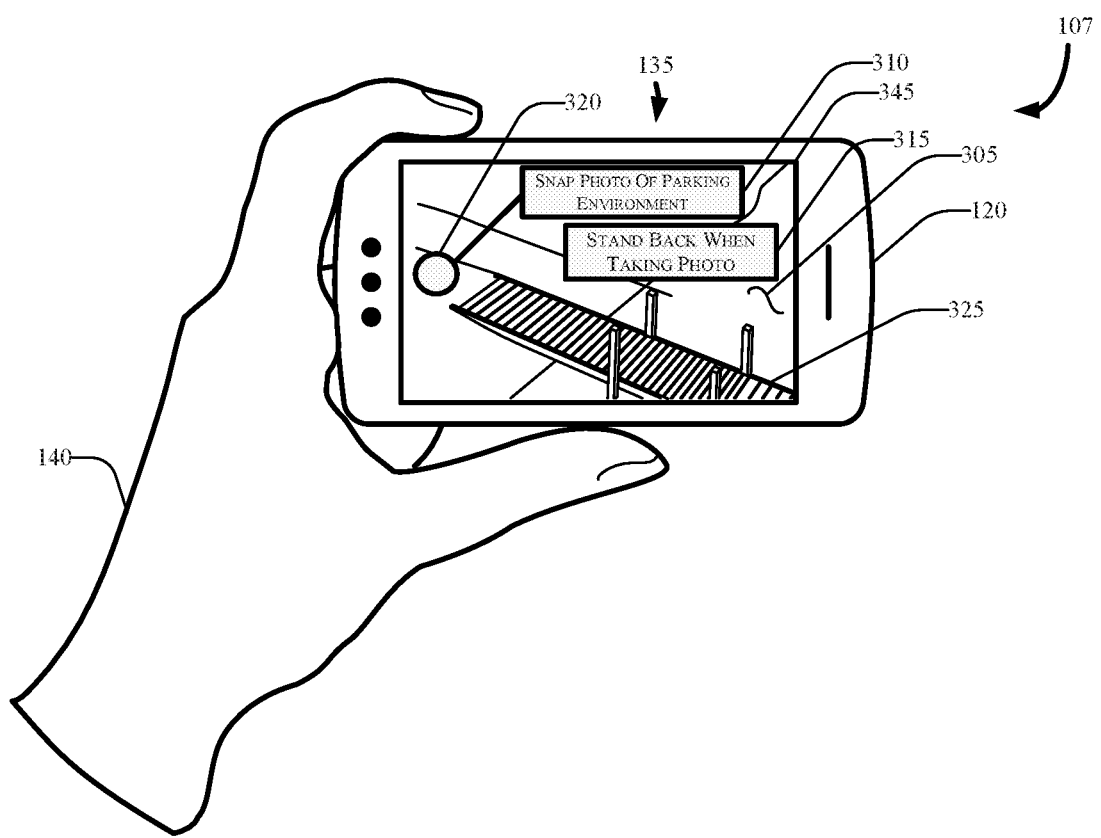
FIG. 3 depicts the example mobile device, configured as part of the RTM system in accordance with the present disclosure.

FIG. 3 depicts the example mobile device 120, configured as part of the RTM system 107, in accordance with the present disclosure. The mobile device 120 is shown with an interface 345 that in a photo mode outputs an image of the example trailer parking environment 100 (shown from FIG. 1) from which to capture a photo. In the example embodiment of FIG. 3, the user 140 may initiate the RTM system 107 by executing an instantiation of the app 135, which may be stored on the mobile device 120, and/or may be a software-as-a-service delivered from the server(s) 170 (depicted in FIG. 1).

Once the user 140 has launched the app 135, and authenticated into an account that securely identifies the mobile device 120 and/or the app 135 with the vehicle 105 (not shown in FIG. 3), an RTM app 135 may launch a photo mode with instructions to guide the user 140 to take an image 305 of the trailer parking environment 100 using a dialogue box having instructions 310. The dialogue box having the instructions 310 may instruct the user 140 to self-locate to an observation point at which the mobile device 120 has a clear view of the target position 109 (as shown in FIGS. 1 and 2) in which they would like to park the vehicle 105 and/or to position the trailer 110 and its payload. Although the image 305 depicts a parking environment at a boat dock, it should be appreciated that the trailer parking environment 100 may be any location. For example, the trailer parking environment 100 may be a garage space or an open space, or some other location not shown.

The app 135 may further include coaching instructions using one or more follow-up dialogue boxes, such as a follow-up instruction dialogue box 315. Accordingly, the user 140 may position the mobile device 120 based on the instructions 310, 315, and snap the image 305 using an image trigger 320 when the follow-up prompt (not shown in FIG. 3) indicates that the view is suitable for determining the target location. The RTM system 107 may use the image 305 to characterize obstacles (e.g., a wooden pier 325) that may be identifiable from the image 305, identify target positions for parking the trailer 110 (shown in FIG. 1), and to perform other aspects and steps described herein.

Figure 4:
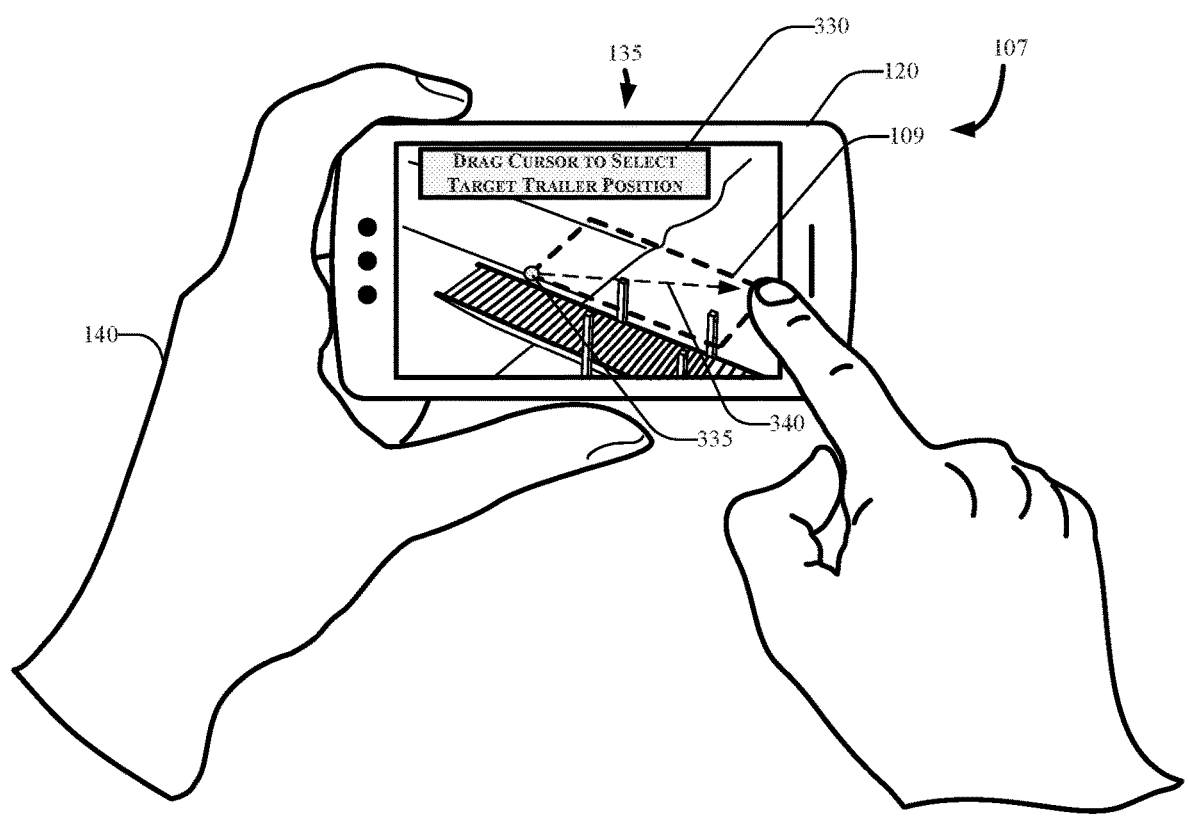
FIG. 4 depicts another view of the app presenting a view of the trailer parking environment using the image, after the system has identified the target position at which the user wishes to position the trailer in accordance with the present disclosure.

FIG. 4 depicts another view of the app 135 presenting a view of the trailer parking environment 100 using the image 305, after the RTM system 107 has identified the target position 109 at which the user 140 wishes to position the trailer 110. In one aspect, The RTM system 107 may prompt the user using a target selection instruction 330, requesting an input from the user 140. For example, the target input instruction 330 may include a touch and drag input of the target position 109 in which the user 140 desires the RTM system 107 to position the trailer 110. In an example embodiment, the app 135 may request the touch input 335, and the drag input 340, to select/define the target position 109. In another aspect, the app 135 may self-select the target position 109, and request that the user 140 provide an approval of the selected target position 109 (such request is not shown in FIG. 4).

The app 135 may determine the target position 109 using various dimensional orientation techniques that place a digital representation of the vehicle 105 and the trailer 110 in 3-dimensional (3D) space, such that the RTM system 107 can identify an appropriate path for the vehicle 105 and trailer 110 to take, and determine control instructions that avoid potential obstacles (e.g., the wooden pier 325). In order to avoid an obstacle, The RTM system 107 must characterize the visual representation of the pier from the dimensional orientation data as an obstacle using image recognition, identify the recognized object from the image 305 as an obstacle, and define relative boundaries of the obstacle(s), the vehicle 105, the trailer 110, and the target position 109 with respect to the vehicle and trailer dimensions, and plot one or more viable paths (not shown in FIG. 4) to accomplish the end goal of positioning the trailer 110 in the target position 109 without damaging the vehicle 105, the obstacles, the trailer 110, the trailer payload, etc.

Figure 5:
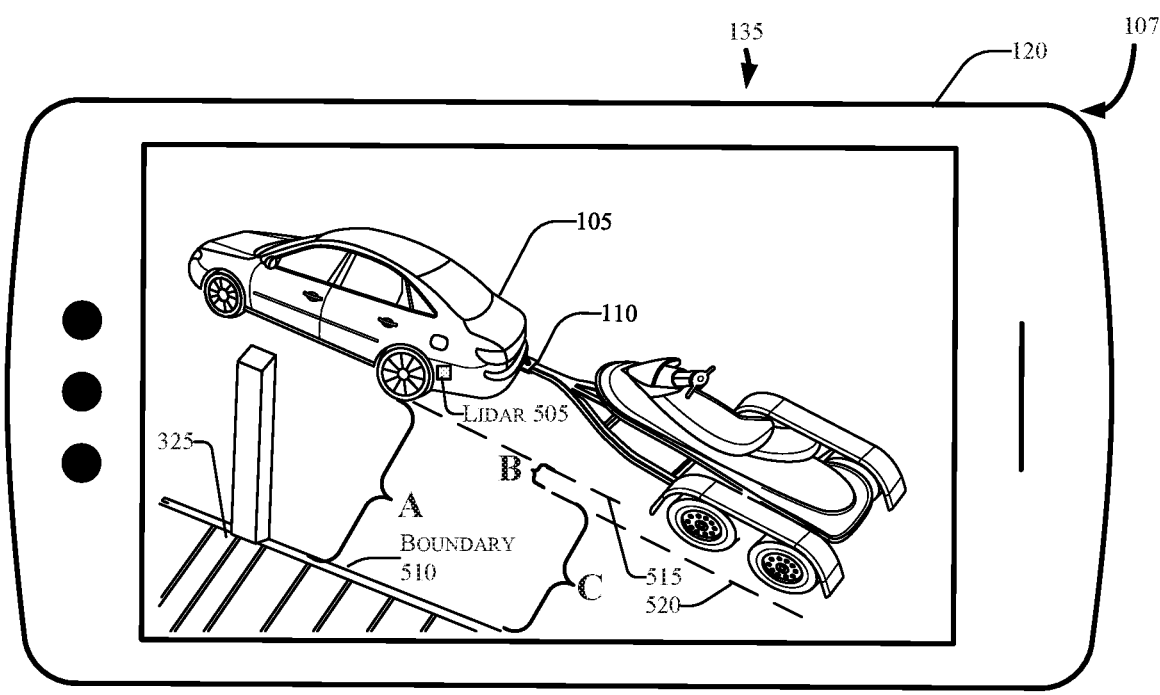
FIG. 5 depicts another view of the app performing a step of determining the target position via the image of the trailer parking environment in accordance with the present disclosure.

FIG. 5 depicts another view of the app 135 performing a step of determining the target position 109 via the image 305 of the trailer parking environment, according to an embodiment. One important step in such an analysis may include determining a boundary using the image 305 of the trailer parking environment 100. As shown in FIG. 5, The RTM system 107 may first determine the trailer dimension using various known techniques. The U.S. Pat. No. 9,352,777 describes one example operation for determining trailer dimensions using the mobile device 120. By way of an overview, the 777 Patent describes techniques that can include receiving trailer dimensional data corresponding to a kinematic model of the trailer 110, identifying a first reference point and a second reference point in the image of the trailer parking environment to calculate a dimension of the kinematic model (not shown in FIG. 5), determining, using the first reference point and the second reference point, a trailer dimension, and updating a trailer profile with the trailer dimension. The trailer profile, in one embodiment, may include a data structure saved locally on a computer memory of the vehicle 105, and/or on the server(s) 170, that includes vehicle IDs, BLEM 195 IDs, user 140 IDs, trailer 110 IDs, relative dimension information of trailer and payload, etc.

In one example embodiment, The RTM system 107 may determine reference points to determine vehicle, trailer/trailer payload, and obstacle boundaries. For example, the mobile device 120 may determine a dimension B, which represents a relative dimension between an edge of the vehicle 105 and an edge of the trailer 110. The RTM system 107 may determine an environmental dimension indicative of a distance between where the trailer currently is (a first trailer location) and a target position 109 (e.g., where the user 140 intends for the RTM system 107 to position the trailer 110) based, at least in part, on the trailer dimensions, the vehicle dimensions, obstacle dimensions, and other known information. For example, if the vehicle dimensions and the trailer dimensions are known values, the RTM system 107 may utilize the autonomous driving sensors 230 (e.g., a LiDAR sensor 505) to evaluate relative distances between the sensor(s) 505 (and by extension, vehicle portions), and the object(s) at issue. In the present example, the wooden pier 325 includes a boundary 510 representing the right side physical edge of the pier, plus a buffer, from the perspective of the photo, which may be the extent to which the vehicle 105 may operate without damage to itself or the wooden pier 325. The LiDAR sensor 505 may determine a distance (A) between the vehicle 105 and the boundary edge 510 of the pier. The RTM system 107 may also be aware of a relative dimension of an edge boundary 520 of the trailer 110, due to the known dimension 515 of the vehicle 105, the trailer 110, and the difference (B) between the two dimensions. In one aspect, The RTM system 107 may determine a distance between the outermost trailer edge 520 and the boundary 510 of the wooden pier (obstacle) 325 (the dimension represented as (C)) by the merits of known dimensions and the difference thereof. For example, the dimension (A) may be observed from sensor data (not shown in FIG. 5) received from the LiDAR sensor 505. The dimension (B), which is a difference of two known values, and the dimension (A), may in conjunction with one another, provide information to the RTM system 107 indicating a distance between the distal end or extent of the boundary 510, and a vehicle or trailer portion, represented by known dimensions A and B.

Figure 6:
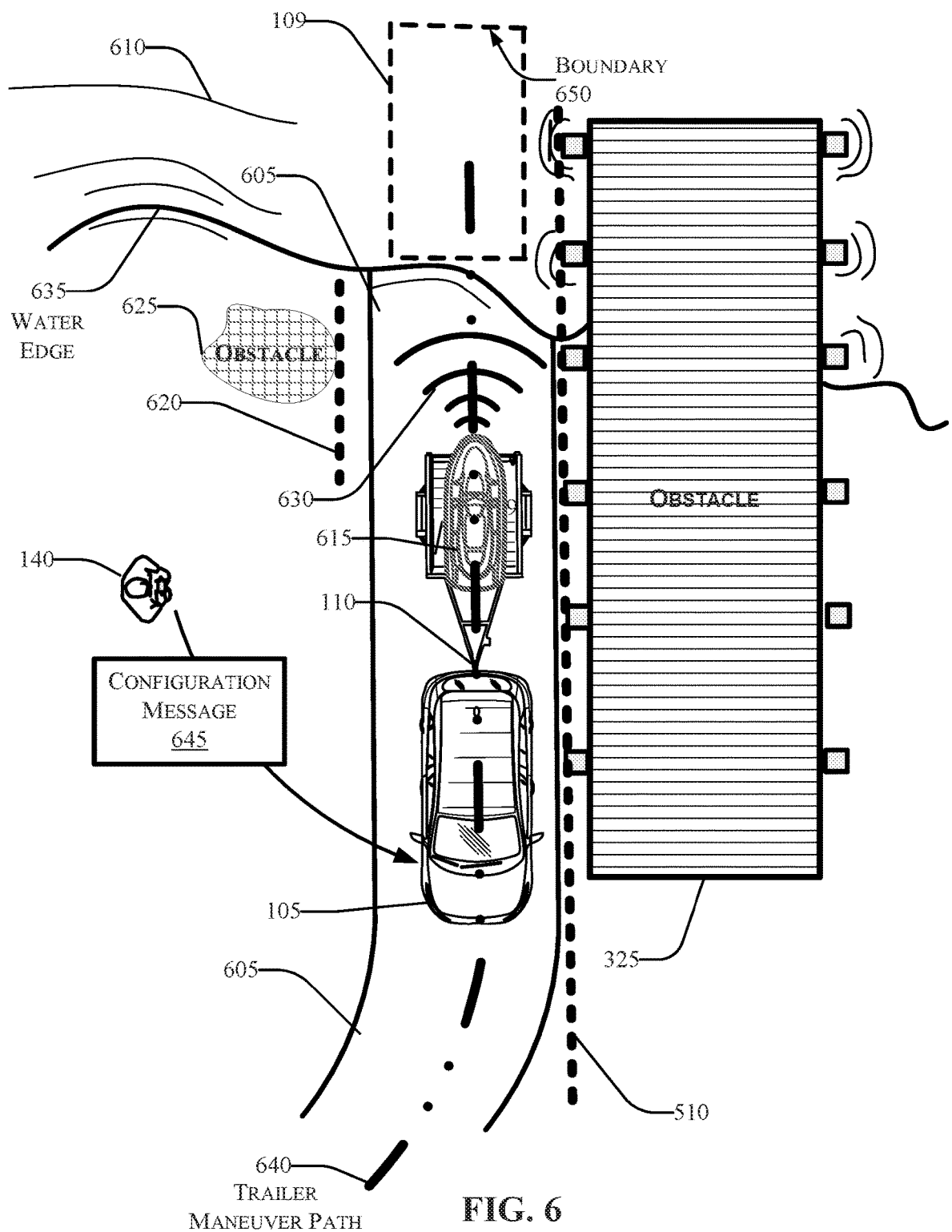
FIG. 6 depicts the vehicle maneuvering the trailer to the water using the RTM system in accordance with the present disclosure.

FIG. 6 depicts the vehicle 105 maneuvering the trailer 110 to water 610 using the RTM system 107, according to an embodiment. In some aspect, the RTM system 107 may detect, using image analysis techniques, the trailer 110 attached to the vehicle 105, and further detect the presence of a boat ramp 605 leading into the water 610, The RTM system 107 may calculate how far to back up the trailer 110 into the water to load or unload a boat (or other marine vehicle). The system may use an identity of the boat and a salinity of the water to determine the depth of the water 610 needed for deployment of a boat 615 from the trailer 110. If an identity of the boat 615 cannot be automatically determined, the app 135 may ask the user 140 to either provide the boat identity, or the water depth required to launch the boat 615. The RTM system 107 may store this information for future use as part of the trailer profile (not shown in FIG. 6).

The RTM system 107 may warn the user if there is an environmental condition such as obstruction(s) in the trailer maneuver path 640, or adjacent to the trailer maneuver path 640, that cannot be avoided to complete the maneuver. In another aspect, the RTM system 107 may provide a warning if the target position 109 is in a space that is tighter than the vehicle 105 and trailer 110 needs to fit. The RTM system 107 may then provide context appropriate feedback, such as generating and outputting a request that the user 140 either remove obstructions from the trailer maneuver path 640, or select a different location target position. The RTM system 107 may ask the user 140 to confirm when this condition has been corrected, by capturing another image of the location with the new target position 109 after correcting the condition. After the user provides the application 135 with image data, the RTM system 107 onboard the vehicle 105 may validate the image to determine that the image includes sufficient information to plot a trailer maneuver path. In one example embodiment, the RTM system 107 may send information 132 to the remote device 120 that includes, for example, a desired vehicle and trailer direction when the feature has completed, an estimated distance from a current location to the target location, graphic information indicative of obstacles and their location (e.g., dimension and location characteristics associated with potential obstacles such as trees, bushes, etc.), a location of the mobile device 120 relative to the vehicle 105, a location of the vehicle 105 and the trailer 110, and other possible information.

The RTM system 107 may identify obstacles (e.g., the wooden pier 325 and the second obstacle 625), identify borders associated with the obstacles, and navigate the trailer 110 to avoid the obstacles. For example, a second obstacle 625 may not be in the direct path of the trailer maneuver path 640, but be close enough to be identified and avoided while navigating the trailer 110. In another aspect, the sensor data 630 may continually look for and identify obstacles and relative distances between the trailer 110, the water 610, the water's edge 635, and other visually obtainable information needed to complete the trailer maneuver operation.

Responsive to generating the trailer maneuver path 640, based on the image 305 and possibly other information such as a trailer profile and a marine vehicle profile received from the server(s) 170 (as depicted in FIG. 1), the RTM system 107 may send a configuration message 645 to the vehicle 105, via the BLEM 195 or other transceiver. The configuration message 645 may include an instruction set (not shown in FIG. 6) that instructs the AV controller 235 (as shown in FIG. 2) to maneuver the trailer 110 to the target position 109 based on the trailer maneuver path 640. For example, the vehicle 105 may position the trailer 110 to a distal extent of a boundary 650 of the desired location (the target position 109). The RTM system 107 may select the boundary 650 of the target position 109 based on information indicative of the desired or required depth to launch the boat 615. In one aspect, the RTM system 107 may determine this information using a measurement of a relative salinity of the water 610. Such a measurement may inform the RTM system 107 of a relative buoyancy of the boat 615, and thus, a required depth to successfully launch the boat 615 off the trailer 110 positioned on the boat ramp 605.

According to an example embodiment, the application 135 may request for user input for approval to commence vehicle motion. In other aspects, the RTM system 107 may require a persistent user interaction to provide a vehicle motion command that maintains vehicle motion. The motion command may take a variety of forms, which can include, for example, a request for user input that traces a complex geometric shape on the mobile device 120 using the touchscreen, holding down one or more buttons, and/or providing an input sequence to mobile device 120 using some combination of touch inputs and button inputs, etc.

Figure 7:
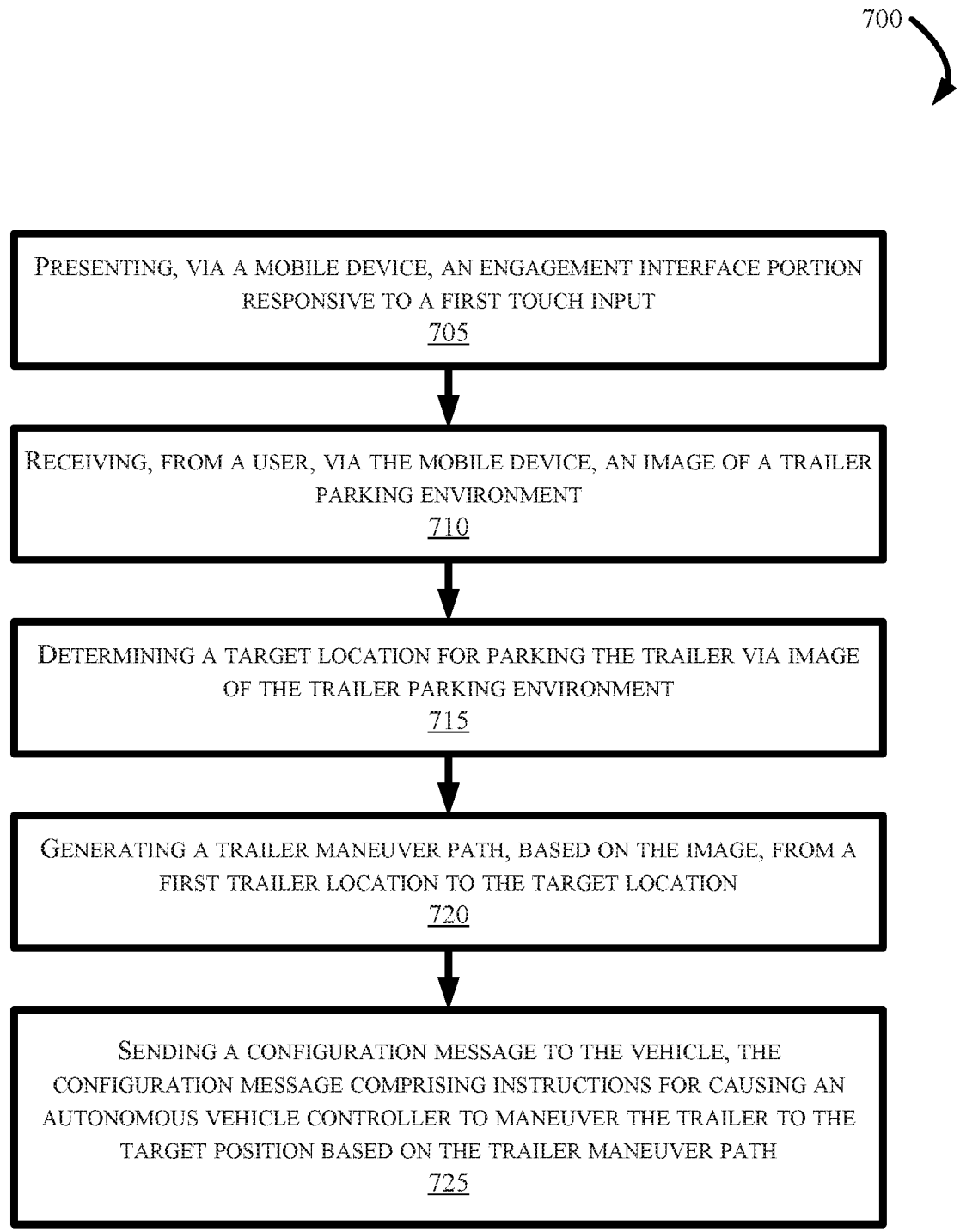
FIG. 7 is a flow diagram of an example method for causing the RTM system to maneuver the trailer to the target location in accordance with the present disclosure.

FIG. 7 is a flow diagram of an example method 700 for causing the RTM system 107 to maneuver the trailer 110 to the target position 109, according to the present disclosure. The following process is exemplary and not confined to the steps described hereafter. Moreover, alternative embodiments may include more or less steps than are shown or described herein, and may include these steps in a different order than the order described in the following example embodiments.

Referring first to FIG. 7, at step 705, the method 700 may commence with presenting, via a mobile device, an engagement interface portion responsive to a first touch input. At step 710, the method 700 may further include receiving, from a user, via the mobile device, an image of a trailer parking environment.

At step 715, the method may further include determining a target location for parking the trailer via an image of the trailer parking environment. This step may include determining a trailer dimension, determining an environmental dimension indicative of a distance between the trailer first location and the target location, determining a boundary using the image of the trailer parking environment, and positioning the target location at a distal end of the boundary, where the target location is represented as a rectangular shape having a distal target edge proximate to the distal end of the boundary.

In some aspects, the method may further include steps comprising receiving trailer/marine vehicle dimensional data corresponding to a kinematic model of the trailer/marine vehicle, identifying a first reference point and a second reference point in the image of the trailer parking environment to calculate a dimension of the kinematic model, determining, using the first reference point and the second reference point, a trailer dimension, and updating a trailer profile with the trailer/payload dimension.

At step 720, the method may further include generating a trailer maneuver path, based on the image, from a first trailer location to the target location. This step may include identifying, based on the image, an obstacle along the trailer maneuver path, generating a modified trailer maneuver path by modifying the trailer maneuver path to avoid the obstacle, determining that an obstruction intervenes the first trailer location and the target location, determining that the trailer maneuver path to the target location does not have an alternative route, and generating a message on the mobile device indicating an instruction to remove the obstacle.

Identifying the obstacle in the path may include steps such as receiving a trailer profile comprising a trailer dimension determining a dimension of the obstacle based on the trailer dimension, determining a first distance from the obstacle to the trailer, determining a second distance from the obstacle to the vehicle, and generating the modified trailer maneuver path based on the first distance and the second distance.

Generating the trailer maneuver path may alternatively include allowing the user to determine whether the obstacle is a true hazard or something that may be ignored. Accordingly, the method may include identifying, based on the image, an obstacle along the trailer maneuver path to the target location, then displaying a user-selectable option to ignore the obstacle. The method may further include receiving a user selection of the user-selectable option to ignore the obstacle, and generating the modified trailer maneuver path to the target location based on the user-selectable option.

In another example embodiment, the generating step can include identifying, based on the image, an obstacle along the trailer maneuver path to the target location, and displaying a user action message via the mobile device instructing a user action to remove the obstacle. Once the user has removed the obstacle, the user may provide an indication using the mobile device that the obstacle is removed and the procedure may be continued.

At step 725, the method may further include the step of sending a configuration message to the vehicle, the configuration message comprising instructions for causing an autonomous vehicle controller to maneuver the trailer to the target position based on the trailer maneuver path. Sending the configuration message to the vehicle, can include sending an instruction set for causing the autonomous vehicle controller to maneuver the trailer to the target position based on the modified trailer maneuver path. In some aspects, changing the trailer maneuver path can be performed using information that includes, for example, the dimension of the obstacle, and/or the first distance, and/or the second distance.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

It should also be understood that the word "example" as used herein is intended to be non-exclusionary and non-limiting in nature. More particularly, the word "exemplary" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method for controlling a vehicle to position a trailer at a target position, comprising;
   presenting, via a mobile device, an application engagement interface portion responsive to a first touch input;

receiving, via the application engagement interface portion, an image of a trailer parking environment;
determining a target location for parking the trailer via the image of the trailer parking environment;
generating, based on the image, a trailer maneuver path for the vehicle and the trailer from a first trailer location to the target location; and
sending a configuration message to the vehicle, the configuration message comprising instructions for causing an autonomous vehicle controller to maneuver the trailer to the target position based on the trailer maneuver path,
wherein determining the target position via the image of the trailer parking environment comprises:
determining a trailer dimension;
determining an environmental dimension indicative of a distance between the first trailer location and the target location of the trailer;
determining a boundary using the image of the trailer parking environment; and
positioning the target location at a distal end of the boundary, wherein the target location is represented as a rectangular shape having a distal target edge proximate to the distal end of the boundary.

2. The method according to claim 1, further comprising:
receiving trailer dimensional data corresponding to a kinematic model of the trailer;
identifying a first reference point and a second reference point in the image of the trailer parking environment to calculate a dimension of the kinematic model;
determining, using the first reference point and the second reference point, a trailer dimension; and
updating a trailer profile with the trailer dimension.

3. The method according to claim 1, further comprising:
identifying, based on the image, an obstacle along the trailer maneuver path to the target location; and
displaying a user action message via the mobile device instructing a user action to remove the obstacle.

4. The method according to claim 1, further comprising:
identifying, based on the image, an obstacle along the trailer maneuver path to the target location;
displaying, via the mobile device, a user-selectable option to ignore the obstacle;
receiving a user selection of the user-selectable option to ignore the obstacle; and
generating a modified trailer maneuver path to the target location based on the user-selectable option.

5. The method according to claim 1, further comprising:
identifying, based on the image, an obstacle along the trailer maneuver path to the target location; and
generating a modified trailer maneuver path to the target location by modifying the trailer maneuver path to avoid the obstacle.

6. The method according to claim 5, further comprising:
determining that an obstruction intervenes between the first trailer location and the target location;
determining that the trailer maneuver path to the target location does not have an alternative route; and
generating a message on the mobile device indicating an instruction to remove the obstacle.

7. The method according to claim 5, wherein identifying the obstacle along the trailer maneuver path comprises:
receiving a trailer profile comprising a trailer dimension;
determining a dimension of the obstacle based on the trailer dimension;
determining a first distance from the obstacle to the trailer;
determining a second distance from the obstacle to the vehicle; and
generating the modified trailer maneuver path based on the first distance and the second distance.

8. The method according to claim 7, further comprising:
sending the configuration message to the vehicle, the configuration message comprising an instruction set for causing the autonomous vehicle controller to maneuver the trailer to the target location based on the modified trailer maneuver path.

9. The method according to claim 8, wherein the modifying comprises changing the trailer maneuver path based on the dimension of the obstacle, the first distance and the second distance.

10. A system, comprising:
a processor; and
a memory for storing executable instructions, the processor configured to execute the instructions to:
present, via an application on a mobile device, an engagement interface portion responsive to a first touch input;
receive, via the mobile device, an image of a trailer parking environment, wherein the trailer parking environment comprises a vehicle and a trailer;
determine a target location for parking the trailer via the image of the trailer parking environment;
generate, based on the image, a trailer maneuver path from a first trailer location to the target location;
send a configuration message to the vehicle, the configuration message comprising instructions for causing an autonomous vehicle controller to maneuver the trailer to the target location based on the trailer maneuver path;
receive trailer dimensional data corresponding to a kinematic model of the trailer;
identify a first reference point and a second reference point in the image of the trailer parking environment to calculate a dimension of the kinematic model;
determine, using the first reference point and the second reference point, a trailer dimension; and
update a trailer profile with the trailer dimension.

11. The system according to claim 10, wherein the processor is further configured to execute the instructions to:
determine a trailer dimension;
determine an environmental dimension indicative of a distance between the first trailer location and the target location;
determine a boundary using the image of the trailer parking environment; and
position the target location at a distal end of the boundary, wherein the target location is represented as a rectangular shape having a distal target edge proximate to the distal end of the boundary.

12. The system according to claim 10, wherein the processor is further configured to execute the instructions to:
identify, based on the image, an obstacle along the trailer maneuver path to the target location; and
display a user action message via the mobile device instructing a user action to remove the obstacle.

13. The system according to claim 10, wherein the processor is further configured to execute the instructions to:
identify, based on the image, an obstacle along the trailer maneuver path to the target location;
display a user-selectable option to ignore the obstacle;
receive a user selection of the user-selectable option to ignore the obstacle; and generate a modified trailer maneuver path to the target location based on the user-selectable option.

14. The system according to claim 10, wherein the processor is further configured to execute the instructions to:
identify, based on the image, an obstacle along the trailer maneuver path; and
generate a modified trailer maneuver path by modifying the trailer maneuver path to avoid the obstacle.

15. The system according to claim 14, wherein the processor is further configured to execute the instructions to:
determine that an obstruction intervenes between the first trailer location and the target location;
determine that the trailer maneuver path to the target location does not have an alternative route; and
generate a message on the mobile device indicating an instruction to remove the obstacle.

16. The system according to claim 14, wherein the processor is further configured to execute the instructions to:
receive a trailer profile comprising a trailer dimension;
determine a dimension of the obstacle based on the trailer dimension;
determine a first distance from the obstacle to the trailer;
determine a second distance from the obstacle to the vehicle; and
generate the modified trailer maneuver path based on the first distance and the second distance.

17. The system according to claim 16, wherein the processor is further configured to execute the instructions to:
send the configuration message to the vehicle, the configuration message comprising an instruction set for causing the autonomous vehicle controller to maneuver the trailer to the target location based on the modified trailer maneuver path.

18. A method for controlling a vehicle to position a trailer at a target position, comprising:
presenting, via a mobile device, an application engagement interface portion responsive to a first touch input;
receiving, via the application engagement interface portion, an image of a trailer parking environment;
determining a target location for parking the trailer via the image of the trailer parking environment;
generating, based on the image, a trailer maneuver path for the vehicle and the trailer from a first trailer location to the target location;
sending a configuration message to the vehicle, the configuration message comprising instructions for causing an autonomous vehicle controller to maneuver the trailer to the target position based on the trailer maneuver path;
identifying, based on the image, an obstacle along the trailer maneuver path to the target location;
displaying, via the mobile device, a user-selectable option to ignore the obstacle;
receiving a user selection of the user-selectable option to ignore the obstacle; and
generating a modified trailer maneuver path to the target location based on the user-selectable option.

19. A method for controlling a vehicle to position a trailer at a target position, comprising:
presenting, via a mobile device, an application engagement interface portion responsive to a first touch input;
receiving, via the application engagement interface portion, an image of a trailer parking environment;
determining a target location for parking the trailer via the image of the trailer parking environment;
generating, based on the image, a trailer maneuver path for the vehicle and the trailer from a first trailer location to the target location;
sending a configuration message to the vehicle, the configuration message comprising instructions for causing an autonomous vehicle controller to maneuver the trailer to the target position based on the trailer maneuver path;
identifying, based on the image, an obstacle along the trailer maneuver path to the target location;
generating a modified trailer maneuver path to the target location by modifying the trailer maneuver path to avoid the obstacle;
determining that an obstruction intervenes between the first trailer location and the target location;
determining that the trailer maneuver path to the target location does not have an alternative route; and
generating a message on the mobile device indicating an instruction to remove the obstacle.

20. A method for controlling a vehicle to position a trailer at a target position, comprising:
presenting, via a mobile device, an application engagement interface portion responsive to a first touch input;
receiving, via the application engagement interface portion, an image of a trailer parking environment;
determining a target location for parking the trailer via the image of the trailer parking environment;
generating, based on the image, a trailer maneuver path for the vehicle and the trailer from a first trailer location to the target location;
sending a configuration message to the vehicle, the configuration message comprising instructions for causing an autonomous vehicle controller to maneuver the trailer to the target position based on the trailer maneuver path;
identifying, based on the image, an obstacle along the trailer maneuver path to the target location;
generating a modified trailer maneuver path to the target location by modifying the trailer maneuver path to avoid the obstacle;
receiving a trailer profile comprising a trailer dimension;
determining a dimension of the obstacle based on the trailer dimension;
determining a first distance from the obstacle to the trailer;
determining a second distance from the obstacle to the vehicle; and
generating the modified trailer maneuver path based on the first distance and the second distance.

* * * * *